United States Patent [19]
Babbitt, Jr.

[11] 4,089,613
[45] May 16, 1978

[54] ECCENTRIC PIN AND BUSHING MEANS FOR MOUNTING MISALIGNED COMPONENTS

[75] Inventor: John H. Babbitt, Jr., Peoria, Ill.

[73] Assignee: Caterpillar Tractor Co., Peoria, Ill.

[21] Appl. No.: 767,001

[22] Filed: Feb. 9, 1977

[51] Int. Cl.² .......................... F16B 2/14; F16B 13/06
[52] U.S. Cl. .................... 403/388; 403/370; 403/371; 85/67; 85/79
[58] Field of Search ............... 403/388, 343, 370, 371, 403/374, DIG. 7; 172/732, 734, 743, 741, 753, 762, 763

[56] References Cited

U.S. PATENT DOCUMENTS

| | | | |
|---|---|---|---|
| 2,102,420 | 12/1937 | Kogstrom | 403/DIG. 7 |
| 2,213,919 | 9/1940 | Michon | 403/DIG. 7 |
| 3,182,986 | 5/1965 | Brockman | 403/370 X |
| 3,347,577 | 10/1967 | Carlson et al. | 403/371 X |
| 3,484,125 | 12/1969 | Randour | 403/370 |
| 3,537,735 | 11/1970 | Hawk | 403/370 X |
| 3,841,771 | 10/1974 | Shankwitz et al. | 403/370 X |
| 4,022,536 | 5/1977 | Pietho et al. | 403/370 X |

FOREIGN PATENT DOCUMENTS 167,934  8/1921  United Kingdom .......... 403/DIG. 7

*Primary Examiner*—Wayne L. Shedd
*Attorney, Agent, or Firm*—Wegner, Stellman, McCord, Wiles & Wood

[57] ABSTRACT

A pin-type connector for interconnecting a pair of members having nominally aligned through-bores without requiring true alignment of the bores including a cylindrical cup-shaped bushing with a discontinuous upstanding wall having a frusto-conical interior surface and a fastener-receiving bore in the bottom of the bushing, the bushing at least partially receiving a pin whose exterior surface is frusto-conical and engages the interior surface of the bushing, with a fastening means being received by the pin through a bore therein. The pin is drawn into the bushing by the fastening means, thereby expanding the wall of the bushing to frictionally engage a bore of one of the members. At least one of the frusto-conical surfaces is slightly eccentric with respect to the longitudinal axis of the element upon which it is formed.

5 Claims, 4 Drawing Figures

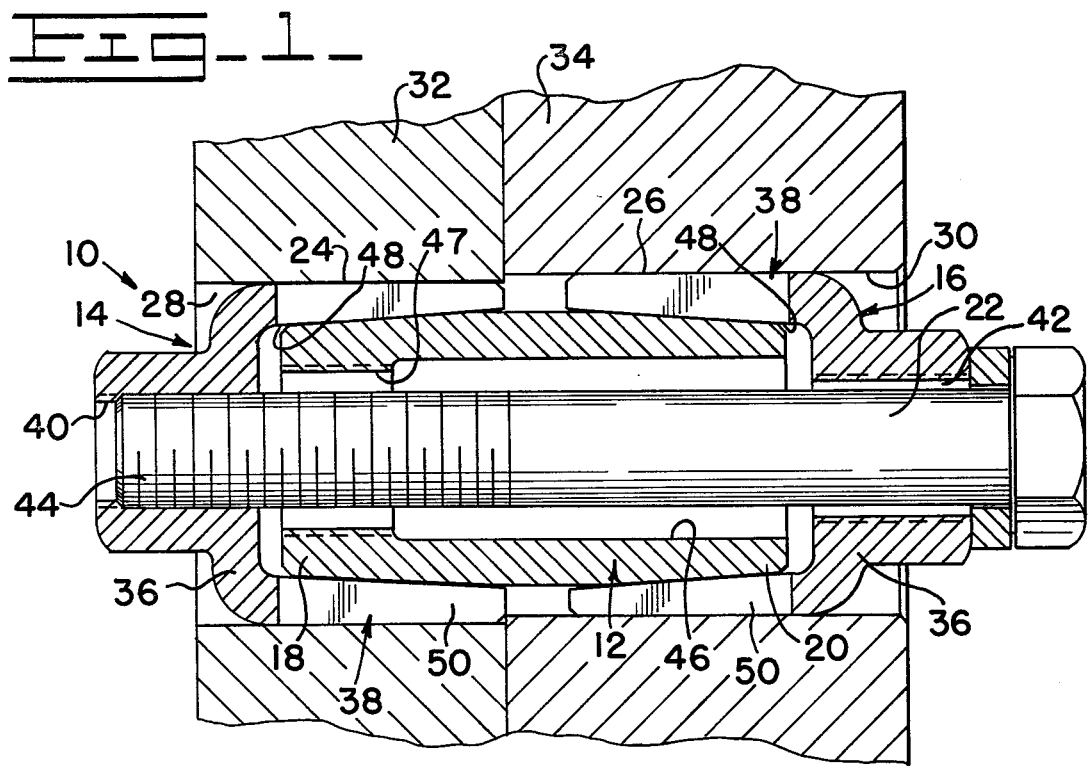

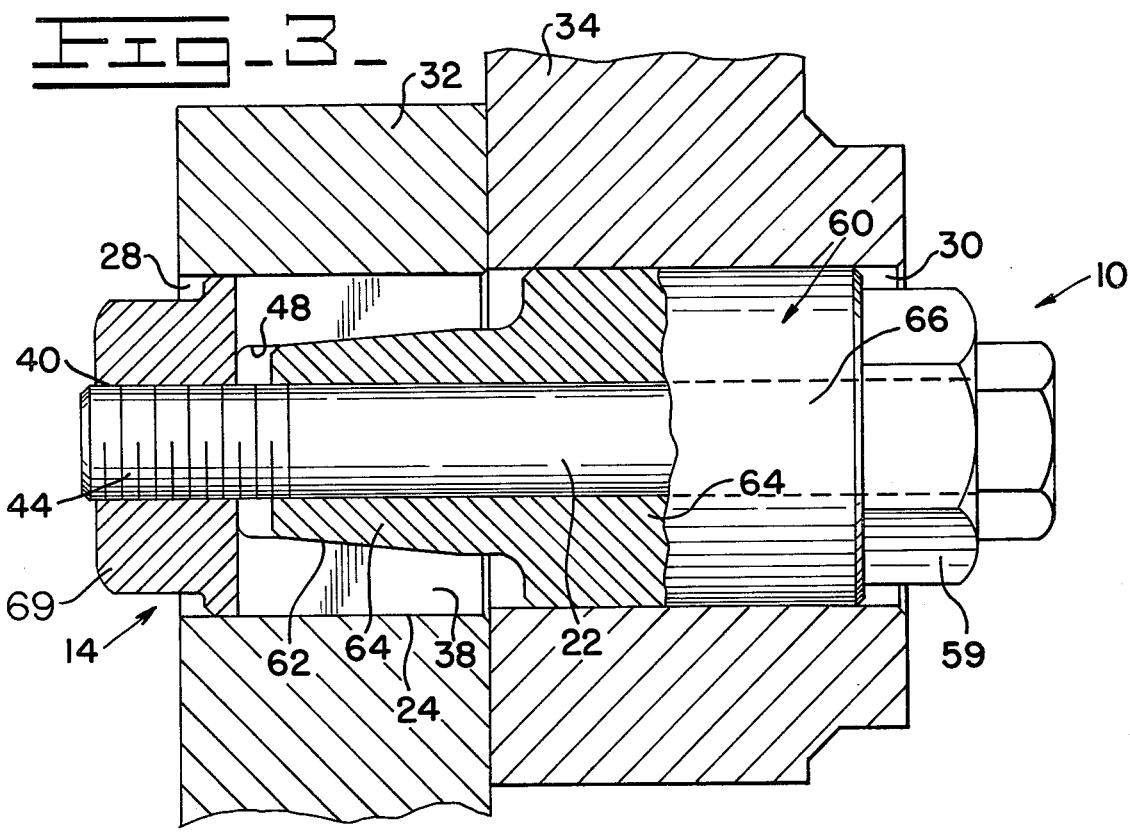
Fig-3-
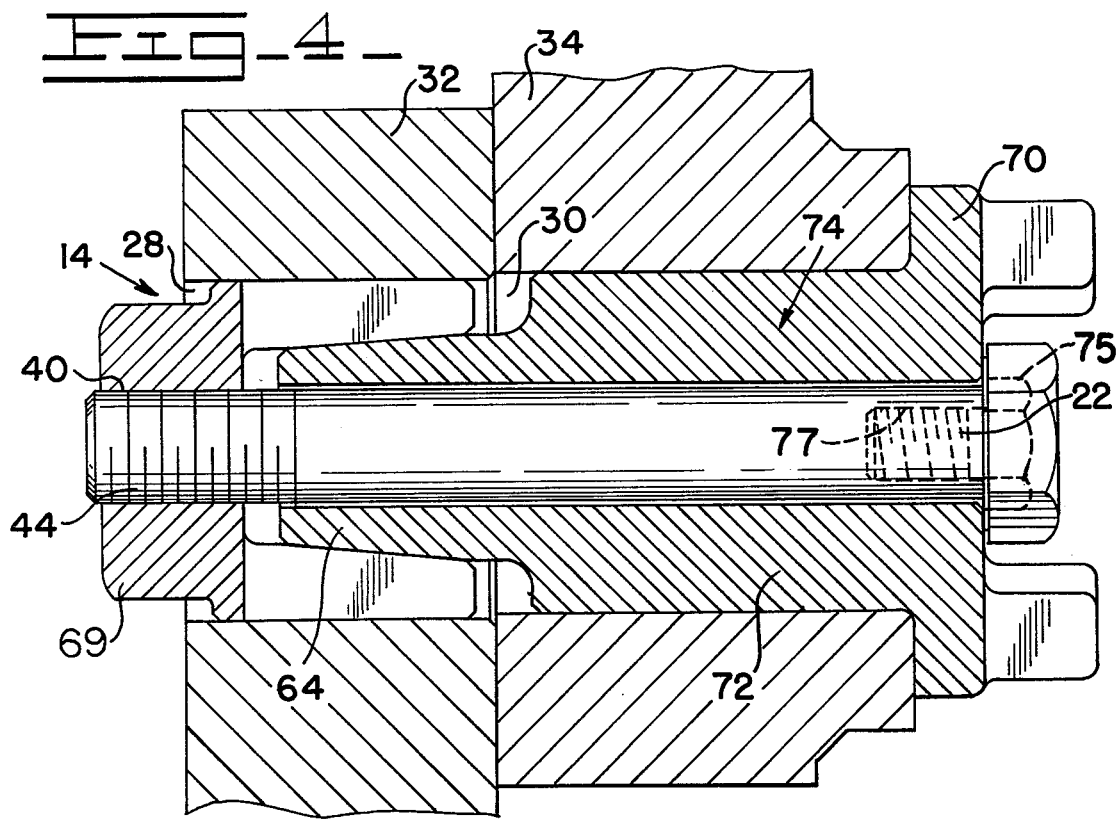
Fig-4-

ECCENTRIC PIN AND BUSHING MEANS FOR MOUNTING MISALIGNED COMPONENTS

BACKGROUND OF THE INVENTION

This invention relates to connectors used to interconnect two members and, more specifically, to connectors used to connect two members through bores therein which are misaligned.

Previous methods of connecting two members through bores in the members involved the use of a rigid pin extending through the bores, and one or more bushings the surfaces of which are concentric with regard to the longitudinal axis thereof, or other means for engaging the bores and the pin. For example, a pin with frusto-conical outer surfaces may engage one or more cup-shaped bushings whose interior surfaces are also frusto-conical, and the walls of which are made to expand by means of drawing the pin into the bushing(s) by means of a fastener, such as a bolt. Such expansion results in tight frictional engagement of the bushing walls against the bore(s) of the member(s), thereby preventing relative movement thereof.

The connecting means described above has the disadvantage of requiring substantially true alignment of the bores of the two members, as the pin is rigid and, when used in connection with the bushings, will allow virtually no adjustment of the bushings relative to the longitudinal axes of the bores.

SUMMARY OF THE INVENTION

It is an object of the invention to provide a new pin-type connector for connecting two members through bores therein without requiring true alignment of the bores. More specifically, it is an object of the invention to provide a connecting means comprising a cup-shaped bushing with a frusto-conical interior surface in engagement with the frusto-conical outer surface of an elongate pin, both the pin and the bushing including a bore for receipt of fastening means, with the frusto-conical surface of the pin and/or the bushing being eccentric with respect to the longitudinal axis of the element on which said surface is formed. Rotation of the bushing within a bore of one of the members will allow the bushing to assume a position, by virtue of the eccentricity of the frusto-conical surface of the bushing and/or pin, that will compensate for an offset due to the misalignment of the bores.

One embodiment of the invention includes two cup-shaped bushings with frusto-conical interior surfaces engaging respective ends of an elongate pin with frusto-conical exterior surfaces. The outer surfaces of the bushings engage the bores of the two members, and are expanded thereagainst by means of a fastener extending through the pin and bores in the bottom of the bushings, the fastener serving to draw the bushings onto the pin. The frusto-conical surfaces of the bushings are eccentric with respect to the longitudinal axes of the bushings. Additionally, the frusto-conical surface of the pin may be eccentric with respect to the pin's longitudinal axis.

Another embodiment of the invention comprises one cup-shaped bushing having an interior frusto-conical surface which is eccentric with respect to the bushing's longitudinal axis. The bushing engages one end of a pin which has a frusto-conical outer surface, also eccentric if desired, and which, when drawn into the bushing by a fastening means, expands the wall of the bushing so as to tightly engage the bushing against the bore of a member. The other end of the pin is cylindrical and slidably engages the bore of a second member, thereby restraining relative sliding motion of the two members.

A further embodiment of the invention includes a pin, one end of which is received in a bushing of the type described above, the other end of which is cylindrical and includes a flange for abutment against the side of a first member when the cylindrical end is received in the bore of said first member and the bushing is received in the bore of a second member. The bushing is placed in tight frictional engagement with the bore of the second member by means of expansion of the bushing wall by a fastening means which extends through the pin and bushing.

DESCRIPTION OF THE DRAWINGS

FIG. 1 is a sectional view of two members interconnected by a pin, two bushing means and a fastening means according to one embodiment of the invention;

FIG. 2 is a sectional view of another embodiment of the invention;

FIG. 3 is a sectional view of still another embodiment of the invention; and

FIG. 4 is a sectional view of a further embodiment of the invention utilizing a single bushing, a fastening means, and a pin including a flange on one end thereof.

DESCRIPTION OF PREFERRED EMBODIMENT

FIG. 1 illustrates a preferred embodiment of the invention generally designated as pin connector assembly 10. Assembly 10 includes a pin 12, bushings 14 and 16 which at least partially receive frusto-conical ends 18 and 20 of pin 12, and fastening means 22, illustratively comprising a bolt. The outer surfaces 24 and 26 of bushings 14 and 16 are cylindrical and engage the interior surfaces of nominally aligned bores 28 and 30 which extend through members 32 and 34, respectively.

Bushings 14 and 16 are cup-shaped and each includes a bottom 36 and an upstanding side wall 38 with a fastener-receiving bore 40 or 42 disposed in bottom 36. As shown in FIG. 1, bore 40 is threaded so as to receive the threaded end 44 of bolt 22. Bore 42 is shown in FIG. 1 to form a passage for receipt of bolt 22. Pin 12 includes a bore 46 through which bolt 22, or other suitable fastening means, extends. The bore 46 includes a threaded end 47 for receipt of a puller tool to assist in disassembly. The bore 42 may be threaded for the same purpose.

The interior surfaces 48 of each bushing wall 38 are frusto-conical and are provided with axial slots 50 to wedgingly receive the frusto-conical ends 18 and 20 of the pin 12. As can be seen in FIG. 1, the frusto-conical surfaces 48 of the bushing walls 38 are each eccentric with respect to the longitudinal axis of the bushing on which each is formed, while the bores 40, 42 and 46 are coaxial with respect to their associated frusto-conical surfaces. In one embodiment, an eccentricity on the order of 0.035 inch is contemplated.

During assembly within the nominally aligned bores 28 and 30 in the members 32 and 34, relative rotation between the bushings 14 and 16 is effected until the centerlines of the frusto-conical surfaces 48 are aligned. The bores 40, 42 and 46 will then be sufficiently aligned to freely receive the bolt 22. The eccentricity of one or more of the frusto-conical surfaces with respect to the longitudinal axis of the element on which it is formed causes the associated one of the bores 40, 42 and 46 to move eccentrically about its center line during such rotation so that alignment can be achieved, notwithstanding the slight misalignment of the members 32 and 34 and the bores 28 and 30 therein.

The bolt 22 may then be applied to the assembly and tightened to draw the bushings 14 and 16 onto the pin 12. The discontinuous nature of the wall 38 by reason of provision of the slots 50 causes the walls 38 to be wedged outwardly into tight frictional engagement with the bores 28 and 30.

Connectors made according to the invention may be advantageously used in mounting a winch casing, or similar piece of equipment, on a tractor. The tractor will include at least one pair of spaced ears, one of the ears being represented by member 32 in the figures, with the space between the ears being substantially the same as the width of the winch casing. The casing will include mounting portions on either side thereof, one of the mounting portions being represented by member 34 in the figures. The casing will be placed on the tractor with the mounting portions being placed in rough alignment with the ears. Although the position of the casing may be adjusted after it is placed on the tractor, it is extremely difficult to obtain strictly true alignment of the bores in the ears and mounting portions, and an offset between the bores usually results. However, such offsets do not impede assembly when connectors according to the invention are used.

FIGS. 2–4 illustrate alternative embodiments of the invention wherein only one bushing is employed, and for brevity, like reference numerals will refer to like elements throughout.

As shown in FIG. 2, end 52 of pin 54 is cylindrical and has substantially the same diameter as bore 30. The frusto-conical surface 56 of end 18 is eccentric with respect to the longitudinal axis of pin 54, and is at least partially received by bushing 14. End 52 fits snugly in bore 30 and is free to travel back and forth therein, while the frusto-conical surface 56 engages the frusto-conical interior surface 48 of bushing 14. The outer surface 24 of bushing 14 is cylindrical and engages bore 28 of member 32. Surface 48 is eccentric with respect to the longitudinal axis of bushing 14.

In assembly, bushing 14 and pin 54 are rotated relative to one another so as to align fastener-receiving bores 40 and 58 located in the bushing and pin, respectively. Rotation of bushing 14 and pin 54 is effected by means of the hexagonal heads 58 and 59 located thereon. (Hexagonal head 59 is best seen in FIG. 3.) Misalignment of members 32 and 34 will be compensated for by the eccentricity of the frusto-conical surfaces of bushing 14 and/or pin 54. When the fastener-receiving bores 40 and 57 are aligned, bolt 22 may be received therethrough. In FIG. 2, end 44 of bolt 22 is threaded, and is received by fastener-receiving bore 40 which is threaded to cooperate therewith. Rotation of bolt 22 will serve to draw bushing 14 further onto end 18 of pin 54, thereby effecting outward expansion of side walls 38 of bushing 14.

Expansion of the side walls will cause bushing 14 to tightly engage bore 28 of member 32. End 52 of pin 54 fits snugly in bore 30, yet is free to travel back and forth therein. The embodiment of FIG. 2 will allow a winch casing to shift slightly between the mounting ears on a tractor, one of which is represented by member 32 in FIG. 2, while upward or downward travel is prevented. It is noted that the extent of such travel will be limited by the ears on either side of the casing. It should also be noted that member 32 may represent a mounting portion of the casing with member 34 representing an ear of the tractor. This arrangement would be encountered when the width of the casing is greater than the spacing of the tractor's ears. In such a case, assembly 10 would be in tight engagement with a mounting portion, represented by member 32, said mounting portion being free to shift relative to the ears of the tractor as the casing shifts on the tractor bed. Again, the degree of travel will be limited by abutment of the mounting portions against the ears.

The embodiment of FIG. 2 includes a threaded bore 57a disposed in the end 18 of the pin 54 for receipt of a suitable puller tool (not shown). Such a tool could be inserted into the bore 57a, as through the bore 57, for the purpose of disassembling the pin 54 from the bushing 14.

FIG. 3 illustrates an alternative embodiment of the invention, the function and structure of which are similar to those of the embodiment of FIG. 2, except that the pin 60 of FIG. 3 snugly receives the bolt 22 and the pin of FIG. 3 does not include a threaded bore for receipt of a puller tool. It is desirable that the frusto-conical surfaces 48 and 62 of bushing 14 and end 64 of pin 60, respectively, both be eccentric with respect to the longitudinal axes of bushing 14 and pin 60, respectively, so as to allow a greater degree of compensation for offset than would be possible if only one of the surfaces were eccentric. In addition, end 66 of pin 60 may be threaded to cooperate with optional threads (not shown) in bore 30. Whether or not threads are so provided, insertion of the pin 60 into bore 30 will be accomplished by rotation of hexagonal head 59. More importantly, rotation of the hexagonal head 59 allows the frusto-conical surface 62 of the pin 60 to be rotated for alignment with the frusto-conical surface 48 of the bushing 14. This is accomplished by simultaneous rotation of the pin 60 and the bushing 14, the bushing 14 being rotated by means of the hexagonal head 69.

The embodiment shown in FIG. 4 is similar to the one of FIG. 3, but for the provision of flange 70 on end 72 of pin 74, the flange abutting against member 34, thereby retaining the pin 74 against the member 34 when the end 64 of pin 70 is inserted into bushing 14. In severe applications one or more bolts 75 extending through flange 70 and received in corresponding threaded bores 77 in member 34 may be provided to insure positive location of pin 74 relative to member 34.

From the foregoing, it will be appreciated that slight misalignment of mounting members, whether intentional or unintentional, will not impede assembly of the members when connectors according to the present invention are used.

What is claimed is:

1. A pin-type connector for interconnecting a pair of members having nominally aligned through-bores without requiring true alignment of the bores, said connector comprising:
   a cylindrical cup-shaped bushing element having a bottom and an upstanding wall, said wall being discontinuous whereby the same may be expanded into tight frictional engagement with a bore and having a frusto-conical interior surface;
   a fastener-receiving bore in said bottom;
   a pin element at least partially received in said bushing and having a frusto-conical outer surface engaging said interior surface;
   a fastener-receiving bore in said pin; and fastening means received in said fastener-receiving bores for drawing said pin into said bushing to expand said wall;

at least one of said frusto-conical surfaces being slightly eccentric with respect to the longitudinal axis of the element on which it is formed.

2. The pin-type connector of claim 1 wherein said fastener-receiving bore in said busing is threaded and wherein said fastening means is a bolt.

3. The pin-type connector of claim 1 wherein one end of said pin includes a flange for retention of said pin against one of said members.

4. The pin-type connector of claim 1 wherein said pin has a second, opposed frusto-conical outer surface engaging the interior surface of a second of said cup-shaped bushings.

5. The pin-type connector of claim 1 wherein each of said frusto-conical surfaces is slightly eccentric with respect to the longitudinal axis of the element on which it is formed.

* * * * *